United States Patent Office 3,782,920
Patented Jan. 1, 1974

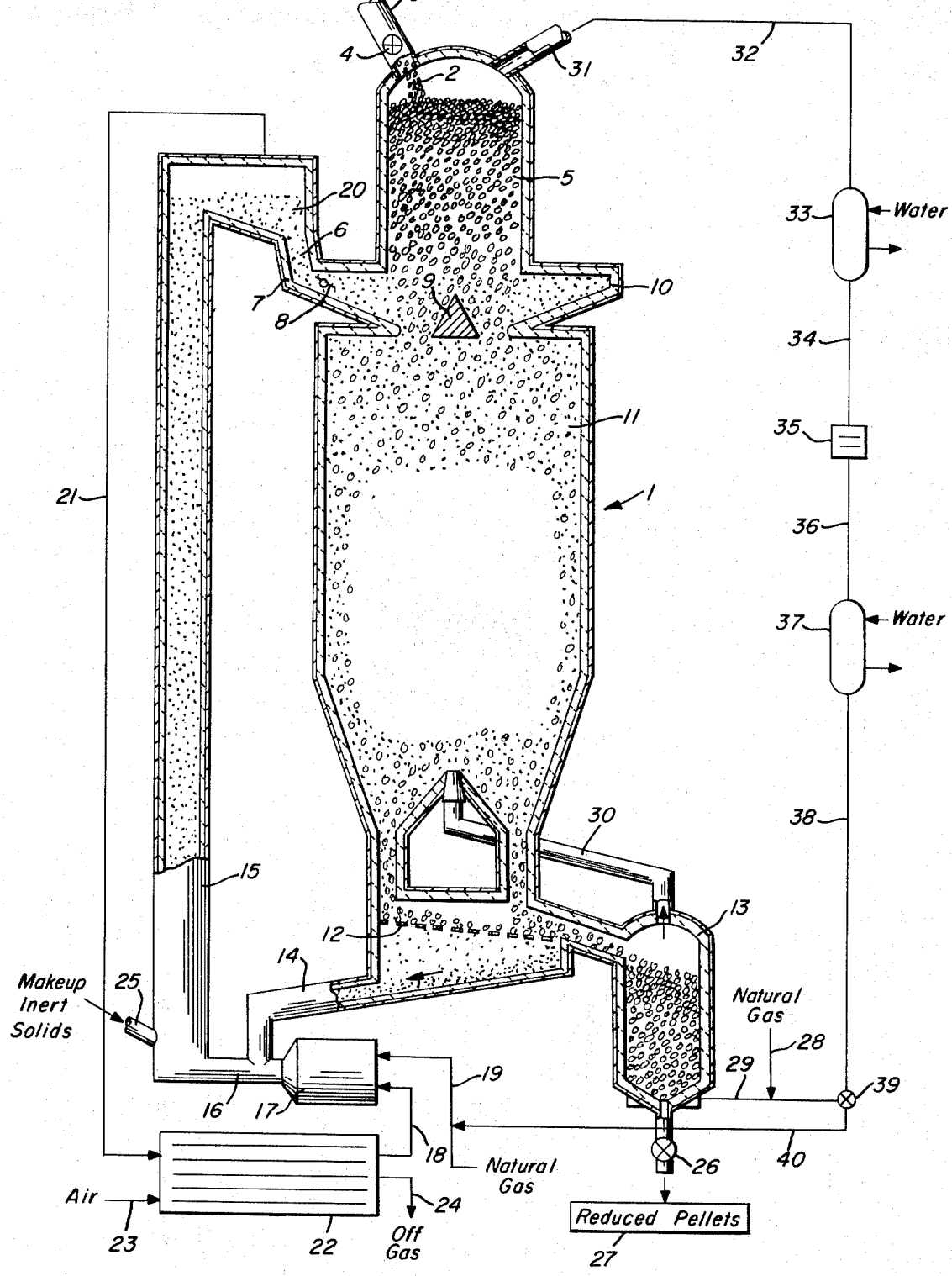

3,782,920
PROCESS FOR DIRECT REDUCTION OF IRON OXIDE COMPACTS
John A. Anthes, Carnegie, and Joseph Vlnaty, Aliquippa, Pa., assignors to Dravo Corporation, Pittsburgh, Pa.
Original application Apr. 29, 1970, Ser. No. 33,002, now Patent No. 3,635,456. Divided and this application Aug. 5, 1971, Ser. No. 169,508
Int. Cl. C21b 13/14
U.S. Cl. 75—37                   12 Claims

ABSTRACT OF THE DISCLOSURE

Process and apparatus for the direct reduction of iron oxides in compact form by preheating iron oxide compacts and enveloping them in hot inert particulate solids at the top of a columnar reactor then passing the mixture downwardly through the reactor countercurrent to an upward flow of natural gas that is introduced into the reactor bottom. Contact of the natural gas and the compacts with the hot solids results in reformation of the natural gas by reaction with carbon dioxide and the production of hydrogen and carbon monoxide, which hydrogen and carbon monoxide reduce the iron oxide of the compacts. Hot gases from the reactor are passed upwardly through a preheater for incoming iron oxide pellets and are then cooled, cleaned, and a portion returned to the bottom of the reactor. The reduced heated compacts are separated from the inert solids at the bottom of the reactor and are passed countercurrent to the natural gas that is being conducted to the reactor to heat it prior to introduction of the gas into the reactor bottom.

This is a divisional application of application Ser. No. 33,002, filed Apr. 29, 1970, now U.S. Pat. 3,635,456.

BACKGROUND OF THE INVENTION

Field of the invention

The present process and apparatus provide for the direct reduction of iron oxide in compact form using natural gas to supply the necessary reducing agents, and is an improvement in the method and apparatus disclosed in the application of George A. Snyder and the herein named Joseph Vlnaty, Ser. No. 735,983, filed Aug. 20, 1968, now U.S. Pat. No. 3,585,023, assigned to the same assignee as the instant application.

Prior art

Natural gas is an excellent source of reducing gases for use in reducing iron oxide in that it is readily available, easily transported, low cost, and usually very low harmful impurities such as sulfur which are found in coal or other solid reducing agents. Attempts have been made to use natural gas as a source of reducing agents in direct reduction processes for iron oxide, but the commercial development of these processes has made little progress. In processes heretofore developed where natural gas has been used on a once-through basis, with spent gas being discharged, a voluminous quantity of gas is necessary in an inefficient process. While it has been proposed to use reaction products along with more natural gas such as the process disclosed in U.S. Pat. 3,375,098, external heaters are needed to effect reforming of the spent gases and, since these reforming reactions are endothermic, high fuel costs result.

BRIEF SUMMARY OF THE INVENTION

In accordance with the present invention, a process and apparatus are provided for the direct reduction of iron oxides in compact form by charging a mixture of compacts and a highly heated inert particulate solid material into the top of a columnar reactor and progressing the mixture downwardly countercurrent to a flow of natural gas that is introduced into the bottom of the reactor. The compacts are enveloped in the hot inert solids which are at a temperature sufficient to heat the iron oxides in the compacts to reducing temperature and the iron oxide is reduced by hydrogen and carbon monoxide resulting from the reforming of the natural gas by reaction with carbon dioxide which takes place as the natural gas permeates the hot mixture of granular solids and compacts in the reactor. The heat required for this highly endothermic reforming process is supplied in the reactor itself by the highly heated inert particulate solid material. Reduced compacts and inert solids are removed from the bottom of the reactor and the reduced compacts are separated and cooled by contact with a mixture of recycle reactor gas and natural gas being conducted to the reactor. The gases from the top of the reactor are passed through a preheater for iron oxide compacts that are to be charged to the reactor and are then cooled and compressed and returned to the bottom of the reactor along with additional natural gas.

BRIEF DESCRIPTION OF THE DRAWINGS

FIG. 2 schematically illustrates an apparatus for carrying out the process.

DETAILED DESCRIPTION

Figure 1:
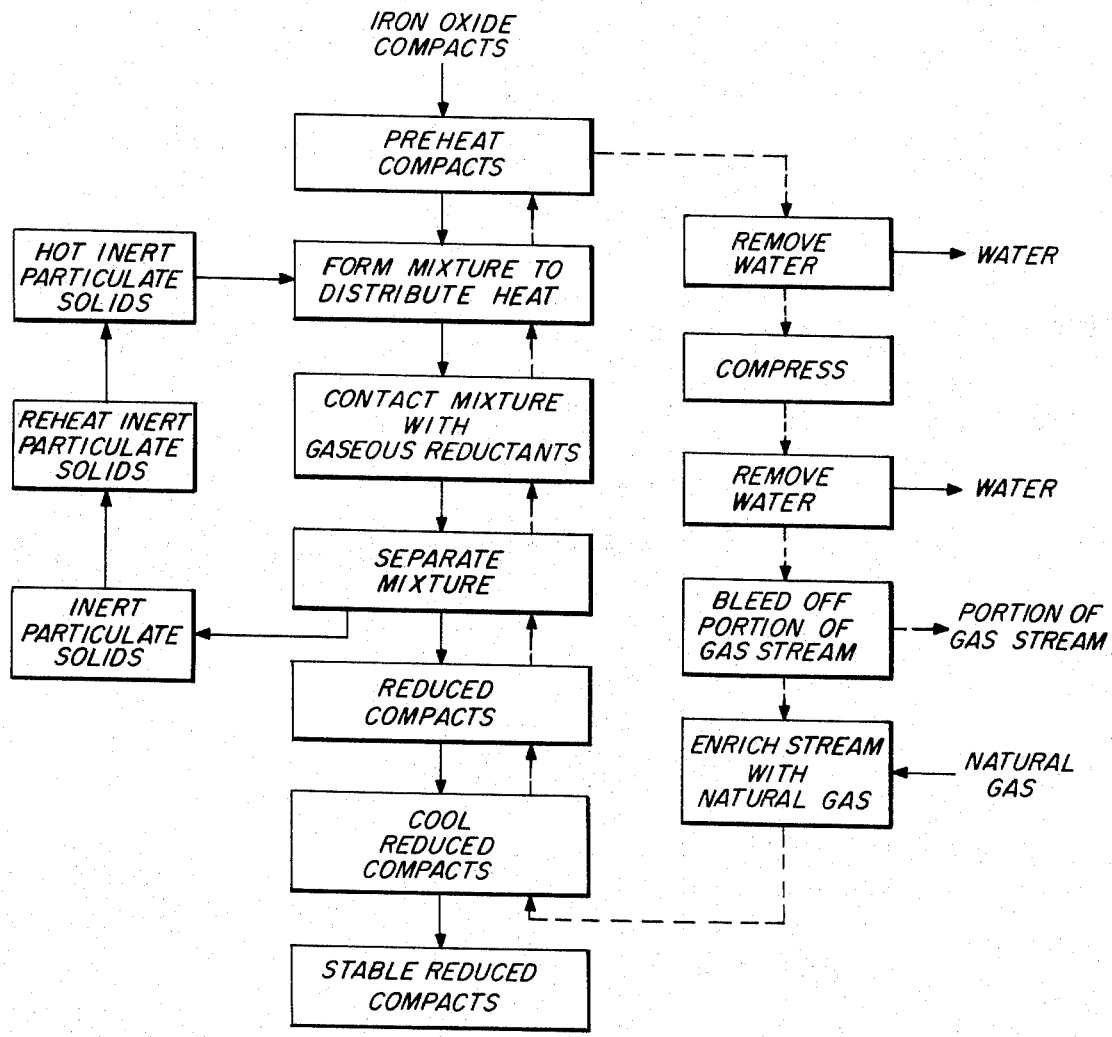
FIG. 1 schematically illustrates by flow diagram the reduction process of the present invention.

The present invention provides for the direct reduction of compacts or pellets of iron oxide. The iron oxide compacts can be "green" or fired pellets, that is pellets which have not been heat-hardened or, hardened pellets can be used. The latter are more easily handled and less subject to breakage or attrition in the reducing process. The compacts are preheated and charged into the top of an enclosed environment where they are mixed with and enveloped in a mass of hot inert particulate solids. The term "inert" as used herein defines a material which does not interfere with the reduction of the iron oxide compacts or adversely affect the reforming of natural gas to produce hydrogen and carbon monoxide in the enclosed environment under conditions necessary for these reactions. Inert solids which have the desired heat capacity and chemical stability include various silicates, burned dolomite, aluminum oxide and silicon carbide, quartz and the like which are of a granular nature so as to be gas pervious. The particle size of the granular material may vary provided that the material enables sufficient gas flow through the reactor, with particles in the order of ⅛ to ¼ of an inch preferred.

The granular material is heated outside the enclosed environment to a temperature in excess of that which is required for reduction of the iron oxide compacts, generally on the order of 1800° to 2500° F. By heating the granular material outside the enclosed environment, conditions for complete combustion of the fuel used for heating the granular material can be achieved and the combustion can be completely carried out to produce carbon dioxide and water without fear of contaminating the reducing environment or reactor with these combustion products.

The primary purpose of the hot granular material is to quickly heat the compacts to a temperature at which the ore will be reduced and a secondary purpose is to continuously supply heat to the interior of the reactor to replace that which is utilized in the reforming of the natural gas supplied to the reactor without burning gas and air in the reactor or applying heat to the outside of the reactor to heat the interior thereof. In addition, the granular material provides a gas permeable cushioning and segregating medium for the compacts. The compacts are enveloped in the granular material and the mixture descends through the enclosed environment. The granular material cushions the compacts and prevents their breakage or attrition while maintaining individual compacts separate from other compacts during reduction so that the compacts, which might otherwise fuse together as the oxide is reduced to metal, will not agglomerate or fuse together. To provide sufficient segregation of the compacts, the volume amount of inert granular material should substantially exceed the volume of the compacts, as something on the order of 5–10 parts by weight of granular material for each part by weight of compacts in the mixture.

After passage of the mixture of compacts and granular material through the enclosed environment countercurrent to a reducing gas and reduction of the iron oxide in the compacts has been effected, the hot reduced compacts are separated from the granular material. Following separation, the reduced compacts are cooled by contacting them with the gases that are being conducted to the enclosed environment. This not only cools the compacts to an extent that they are stable to the atmosphere upon discharge from the apparatus, but results in the preheating of the gas flowing to the reactor to a temperature in the range of 1800° to 2000° F., at which temperature some of the reforming reactions are then accelerated when the hot natural gas and recycle gas are introduced into the enclosed environment and contact the still hotter granular solids within the environment.

The use of natural gas to provide the reducing agents for iron oxide eliminates contamination of the reduced product by ash or sulphur as when coal, coke, or char are used as a reducing agent. Although a small amount of solid reductants may be present in the compacts, the major reduction is achieved through the use of natural gas to supply the reducing agents in the present invention. The components generally found in natural gas such as methane, ethane or other lower hydrocarbons are reformed in the enclosed environment by carbon dioxide which, as is known, is produced during the reduction of iron oxides. The reduction is schematically illustrated by the equation:

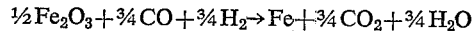
$$\tfrac{1}{2}Fe_2O_3 + \tfrac{3}{4}CO + \tfrac{3}{4}H_2 \rightarrow Fe + \tfrac{3}{4}CO_2 + \tfrac{3}{4}H_2O$$

The carbon dioxide produced during the reduction is then available within the enclosed environment and at the elevated temperature to reform the components of the natural gas such as methane, according to the equation:

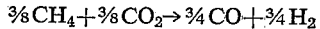
$$\tfrac{3}{8}CH_4 + \tfrac{3}{8}CO_2 \rightarrow \tfrac{3}{4}CO + \tfrac{3}{4}H_2$$

to produce additional carbon monoxide and hydrogen for reducing the iron oxide in the enveloped compacts. These reforming reactions are highly endothermic but, because of the presence of the mass of hot inert solids, the temperatures within the reactor are maintained sufficiently high to provide a highly reducing condition. Thus, all heat for the present process is provided by the hot inert material and preheated gases. Since the solids have a higher heat retaining capacity than gases, the presence of the solids retains more heat in the reactor than would be retained if only compacts and gases were present in the reactor with no inert material to serve as a heat exchange but otherwise inert medium. The necessary throughput of natural gas is thus minimized. This minimization is possible because the gases serve principally as reducing agents and not as the sole source of heat within the reactor.

The hot gases from the enclosed environment are passed into a preheater and contacted with the incoming iron oxide compacts immediately prior to the introduction of the compacts into the reactor, and following this, these gases are withdrawn from the compact preheater.

In the present process, the amount of natural gas which must be introduced into the reactor and passed countercurrent to the iron oxide compacts in the enclosed environment can be as low as about two times the theoretical amount required for reduction. The specific quantity for any particular case is determined by heat transfer considerations, being the amount required to cool the reduced pellets to a temperature where they can safely be exposed to the atmosphere without re-oxidizing and also the amount required to adequately preheat the incoming pellets prior to discharge of the gas from the reactor.

The off gas which is withdrawn from the compact preheater, contains mainly carbon monoxide and hydrogen, with lesser amounts of carbon dioxide, methane or other hydrocarbons, and water which, as seen from the first equation above, result from the reduction of the iron oxide. This now partially cooled off gas is then further cooled to remove the water of reduction by a spray cooler or other condensing means, and is preferably then passed through a compressor where the absolute pressure of the gas is increased so that additional water can be removed in an additional condensing means.

Prior to the return of some of the gas to the enclosed environment as recycle gas, the gas stream has a portion thereof bled from the stream to maintain the desired pressure in the system and fresh natural gas is mixed with the stream to replenish it. The replenished stream is then preheated as above explained by contact with hot reduced compacts and introduced, in a preheated condition, into the enclosed environment. If desired, the gas bled from the stream can be advantageously used for part of the fuel in the combustion chamber for heating the inert particulate solids necessary for the process.

FIG. 2 illustrates the apparatus of the invention in which the closed environment is provided by an elongated vertical reactor 1. The reactor 1 is refractory lined or otherwise protected against the high temperatures of the process. Iron oxide compacts 2 are charged through a conduit 3, which contains a star wheel 4 or other means to minimize the escape of gases or the influx of air, into a preheater 5 at the top of the reactor where they are preheated by off gases from the reactor. The hot granular material 6, which has been heated to a temperature on the order of 2400° F., is charged from a duct 7 which contains a regulating means 8 into the upper end of the reactor. Means 8 regulates the rate of introduction of the granular material into the reactor and also prevents loss of gases from the reactor through the duct. The compacts 2 and hot granular material 6 are mixed in a distributing means such as a divider or vibrator 9 and a distribution ring 10, the distributing means interconnecting the preheater 5 and columnar reactor 1. The mixture of hot granular material and compacts is charged into the reactor and passed by gravity through the section 11 of the reactor where reduction of the compacts is achieved. After sufficient contact time in the reactor, determined by the height of the reactor and rate of removal of material from the bottom of the reactor, the reduced compacts are separated, out of contact with air, from the granular material by an inclined grate or refractory screen 12 at the bottom of the reactor. The granular material passes through the screen 12 while the reduced compacts are moved to a cooling chamber 13.

The granular material, after separation from the compacts, is transferred through a chute to the heating chamber of a conventional air lift furnace. The furnace has a refractory lined tube-like column 15 that has a closed bottom with a hot combustion gas inlet 16 connecting it to a combustion chamber 17. Chamber 17 has an air inlet line 18 and fuel inlet line 19. A supply of hot combustion gases from the chamber 17 heats the granular material and carries it up the column 15. At the top of the column 15, a chamber 20 is provided to maintain a supply of hot granular material for introduction to the reactor. A hot gas discharge line 21 is provided to carry off the spent hot combustion gases. Some of the spent gas may be used in heat transfer devices such as heat exchanger 22 to which combustion air is fed from a source (not shown)

through line 23 to be preheated in the heat exchanger and then is delivered through line 18 to the combustion chamber 19. The spent gases are then discharged through line 24. Natural gas or other fuel is fed to the combustion chamber through line 19 for admixture with the air from line 18. Makeup granular material may be provided for the air lift furnace through line 25 as required.

The reduced compacts, after separation from the granular material, are cooled by contact with the incoming natural and recycled reducing gas in a cooling chamber 13 and are then discharged through a star wheel 26 or other air excluding device to a storage area 27. If desired, the reduced compacts can be fed directly to a conventional steel making device.

In the initial start-up of the process, natural gas is introduced from a source (not shown) to the cooling chamber through line 28 and conduit 29. The gas passes upwardly through the cooling chamber 13, then through line 30, and is introduced into the reducing section 11 of the reactor. Following the reduction and reforming reactions within the enclosed environment of the reactor, the gas flows through the preheater 5 in heat exchange relation to the compacts therein and is exhausted through exit 31. The exhausted gas flows through line 32 to a condenser 33. The condenser which may be a spray type device removes some water from the gas and the gas then flows through line 34 to a compressor 35 and the compressed gas then flows through line 36 to a further device 37 for removing additional water which may be present in the gas, after which it passes through line 38 to a valve 39. Valve 39 distributes a portion of the cleaned and dewatered gas through the line 29 for admixture with fresh natural gas from line 28 and return to the reactor. Another portion of this gas is carried through bleed line 40 to the fuel line 19 of the air lift furnace.

There has been described a process and apparatus for the direct reduction of iron oxide compacts using natural gas as the source of the reducing agents. A hot inert solid material is used to heat the compacts and reducing gases to reduction temperature and to heat the natural gas to reforming temperature to produce hydrogen and carbon monoxide for reduction purposes. The reforming reaction and supply of hot inert material enables the use of a lesser amount of natural gas than that required in prior processes. The envelopment of the iron oxide compacts in the inert solids cushions them during passage through a columnar reactor and prevents compacts from sticking together during the reduction.

We claim:

1. A continuous process for reducing iron oxide, wherein the iron oxide has been formed into compacts, comprising:
    (a) charging a mixture of iron oxide compacts and hot inert particulate solids into the upper region of a vertical enclosure, the inert solids being at a temperature in excess of that required to reduce the iron oxide and in an amount sufficient to maintain each compact substantially segregated from other compacts in the mixture,
    (b) introducing reducing gas into the lower region of the vertical enclosure,
    (c) passing the mixture by gravity through the vertical enclosure in countercurrent contact to the reducing gas during which passage the iron oxide in the compacts is heated to reducing temperature by the hot inert solids and at least partially reduced by said reducing gas,
    (d) withdrawing the heated reduced compacts and inert solids from the enclosure at a controlled rate so that the retention time of the compacts in the vertical enclosure is controlled,
    (e) separating the withdrawn heated and reduced compacts from the inert solids, and
    (f) passing the reducing gas in heat exchange contact with separated reduced compacts to preheat the reducing gas and cool the compacts and then introducing the preheated gas into the enclosure.

2. A continuous process for reducing iron oxide as defined in claim 1 wherein the reducing gas introduced into the lower region of the vertical enclosure is natural gas and wherein said natural gas is reformed to produce hydrogen and carbon monoxide within said enclosure.

3. A continuous process for reducing iron oxide as defined in claim 2 wherein off-gas from said enclosure is passed in countercurrent contact to iron oxide compacts to preheat the compacts prior to charging them into the vertical enclosure.

4. A continuous process for reducing iron oxide as defined in claim 3 wherein said off gas, after contact with said iron oxide compacts, is returned for heat exchange contact with separated reduced compacts and introduction into the vertical enclosure.

5. A continuous process for reducing iron oxide as defined in claim 4 wherein said hot inert solids are at a temperature in a range of 1800° to 2500° F. when charged to said vertical enclosure.

6. A continuous process for reducing iron oxide as defined in claim 5 wherein said hot inert particulate solids are selected from silica, burned dolomite and aluminum oxide.

7. A continuous process for reducing iron oxide as defined in claim 4 wherein the amount of natural gas introduced into the vertical enclosure is only about two times that necessary for reduction of the iron oxide present in the vertical enclosure.

8. In a continuous process for reducing iron oxide compacts wherein natural gas is used as a source of reducing media, the improved process, comprising:
    (a) charging a mixture of iron oxide compacts and a hot inert particulate solid material into one end of an enclosed environment, the inert solids being at a temperature sufficient to heat the admixed compacts to reduction temperature while maintaining the inert solids in a free-flowing state, and in an amount sufficient to maintain compacts separate from each other by portions of inert solids,
    (b) introducing natural gas into the other end of the enclosed environment for countercurrent contact with the mixture,
    (c) progressing the mixture into countercurrent contact to the natural gas so that the iron oxide compacts are reduced with the reduction producing carbon dioxide, which carbon dioxide reacts in situ with lower hydrocarbon components of the natural gas within the enclosed environment to produce hydrogen and carbon monoxide for reduction of iron oxide compacts,
    (d) collecting a portion of the hydrogen and carbon monoxide and returning the same as recycle gas for admixture with said natural gas being introduced into the other end of the enclosed environment,
    (e) withdrawing the reduced iron oxide compacts and inert solids from the enclosed environment, and
    (f) cooling the withdrawn compacts in a non-oxidizing atmosphere.

9. In a continuous process for reducing iron oxide compacts as defined in claim 8, the additional improvement wherein said non-oxidizing atmosphere for cooling the reduced compacts comprises natural gas and recycle gas which is to be introduced into the enclosed environment.

10. The continuous process for the reduction firing of iron oxide compacts, comprising:
    (a) continuously moving an input mixture of iron oxide compacts and hot inert granular material through an elongated reactor from a receiving end of the reactor to a discharge end thereof counter-current to a reducing gas comprising primarily a mixture of natural gas and off-gases from the reactor, (b) discharging and separating the compacts and inert material out of contact with air at the discharge end of the reactor, (c) preheating the reducing gas before it enters the reactor by flowing it in heat exchange relation to the hot compacts after they have been separated from the inert material and thereby effect cooling of the compacts for discharge into the air, and (d) utilizing off-gases from the reactor to preheat the compacts immediately preceding their becoming mixed with the hot inert granular material.

11. The continuous process for the reduction firing of iron oxide compacts as defined in claim 10 wherein the off-gases after preheating the compacts have water produced in the reduction process removed therefrom and thereafter mixing said off-gases with the natural gas.

12. The continuous process for the reduction firing of iron oxide compacts as defined in claim 10 wherein the hot inert granular material separated from the ore compacts is immediately introduced into a furnace to be heated to a higher temperature and then recycled to mix with other incoming preheated compacts.

References Cited
UNITED STATES PATENTS

| | | | |
|---|---|---|---|
| 3,375,099 | 3/1968 | Marshall | 75—35 |
| 3,427,148 | 2/1969 | Peters | 75—37 |
| 3,585,023 | 6/1971 | Vlnaty | 75—37 |
| 2,592,783 | 4/1952 | Aspegren | 75—35 |
| 2,873,183 | 2/1959 | Pike | 75—35 |
| 3,205,065 | 9/1965 | Mayer | 75—37 |
| 2,877,106 | 3/1959 | Aspegren | 75—34 |

CHARLES N. LOVELL, Primary Examiner

P. D. ROSENBERG, Assistant Examiner

U.S. Cl. X.R.

75—3